United States Patent [19]

Tucker et al.

[11] Patent Number: 5,654,851
[45] Date of Patent: Aug. 5, 1997

[54] HEAD ARM ASSEMBLY HAVING AN INTEGRAL ARM WITH A PORTION ENCASED IN A RIGID MOLDED MATERIAL

[75] Inventors: Larry E. Tucker, Fremont; William P. Heist, Morgan Hill, both of Calif.

[73] Assignee: Read-Rite Corporation, Milpitas, Calif.

[21] Appl. No.: 505,382

[22] Filed: Jul. 21, 1995

[51] Int. Cl.$^6$ .................................................. G11B 5/48
[52] U.S. Cl. ............................................................ 360/104
[58] Field of Search ...................................... 360/104, 106

[56] References Cited

U.S. PATENT DOCUMENTS 5,185,683  2/1993  Oberg ........................................ 360/104

*Primary Examiner*—A. J. Heinz
*Attorney, Agent, or Firm*—Nathan N. Kallman

[57] ABSTRACT

A head arm assembly for use in a disk file includes an elongated thin element having one end supporting a head gimbal assembly (HGA) which is biased toward a recording surface of a magnetic disk during normal operation. The element is preferably made of a metal that has a flex characteristic predetermined in accordance with selected specifications of the head arm. The opposite end of the element is provided with an etched out opening for a pivot bearing and is encased in a moldable material having a different and more rigid flex characteristic. The head arm assembly is provided with the required two flex characteristics for successful operation but does not require the precise joining of two separate and distinct metal elements.

10 Claims, 3 Drawing Sheets

HEAD ARM ASSEMBLY HAVING AN INTEGRAL ARM WITH A PORTION ENCASED IN A RIGID MOLDED MATERIAL

CROSS-REFERENCE TO RELATED PATENT

U.S. Pat. No. 5,410,794 to L. E. Tucker, which issued May 2, 1995, is directed to an assembly of magnetic head arms on a pivot bearing of a rotary type actuator of a disk file which may be employed with the head arm assembly of the present invention. The subject matter of U.S. Pat. No. 5,410,794 is incorporated herein by reference.

FIELD OF INVENTION

This invention relates to a magnetic head arm assembly for use in a disk file data storage device.

DESCRIPTION OF RELATED ART

Typically, a disk file comprises one or more magnetic storage disks each having magnetic surfaces for storing recorded data. The disks are mounted on a spindle and are continually rotated at a substantially constant speed. A number of head arm assemblies are arranged in a stack resembling a comb-type structure. The head stack assembly is attached to the pivot bearing of an electromagnetic actuator. The actuator positions the transducers to preselected concentric recording tracks under control of an address signal supplied to the actuator from the data processing system. A magnetic transducer is deposited on the distal end of the head arm.

Disk file configurations vary in the number of disks employed, the size of the disks, and the type of actuators that are employed to position the magnetic head to an addressed recording track. Since total storage capacity of a disk file has, in recent years, become an important parameter, most file configurations employ a plurality of disks mounted on a common spindle, with each disk surface having a separate magnetic transducer associated with it.

Two general types of electromagnetic actuators have been used for positioning the magnetic heads. In one type of actuator, head arm assemblies are moved during the track accessing operation in a straight line which generally follows a radial line through the center of the spindle. The second type of actuator is referred to as a rotary actuator. This type actuator moves the head arm assemblies during the track accessing operation on an arc substantially normal to the tracks. Rotary type actuators are generally preferred when physical size is critical since more space is required if the head stack moves in and out along a radial line.

In both types of actuators, the head arm assemblies are assembled into a comb-type structure with the transducers at the distal ends of the head arms aligned vertically. In a similar fashion, the other ends of the arm assemblies are attached to the actuator so that each arm moves over a corresponding path. The comb-type structure is referred to in the art as a "Head Stack Assembly" (HSA).

Personal computers and in particular the laptop types of personal computers have imposed a size parameter on disk files so that as the need for more storage capacity is increasing, the requirement for disk drive size is decreasing. Disk diameter is an important factor in determining the footprint of the drive. The number of disks in the stack generally determines the height of the drive. In the last few years disk diameters for fixed disk drives used in personal computers have decreased from five and one-half inches to three and one-quarter inches, and to one and one-eighth inches. Prototype disk files employing one-inch disks are discussed currently in the literature. The decrease in size has had little or no impact on storage capacity, in that the various technologies which directly affect capacity, such as linear recording density and track density, have been greatly improved. Disk drive configurations now can incorporate more disks in a given height because a decrease in the spacing between disks is made possible by improvements in head arm assemblies.

A major effect of the decrease in size has been the inability to employ past assembly practices in the construction of these smaller disk files. This is particularly true of the comb-type head arm assembly which is the movable part associated with a rotary type actuator that positions the magnetic transducers during track accessing operations. Prior art assembly operations of the stack involved providing a guide hole in the actuator end of the head arm. Each head arm assembly was sequentially placed on a shaft with suitable ring type spacers between each arm. Each arm was affixed to the shaft by swaging or crimping the material defining the guide hole. Since the head arms were relatively sturdy, the damage to these members was minor and the swaging operation did not adversely affect the assembly. These head arm assemblies were also relatively large so that an operator with average dexterity experienced no difficulty in sequentially assembling the head stack.

With decrease in size, the head arms per se became less sturdy and hence were more sensitive to the swaging operation with the result that the alignment of the heads was adversely affected. Further, if one head arm proved, on testing of the head stack, to be out of specification, the rework operation to replace the bad head arm or to salvage the good head arms was very complicated due to the swaging construction.

In addition, the individual components on the head arm became more fragile and were easily damaged if extreme care was not exercised during the head arm assembly operation. A head arm assembly typically comprises a head suspension formed with a rigid or relatively stiff element, known as a load beam, and a relatively flexible member or flexure, which have been joined together by a swaging operation. A head gimbal assembly (HGA) comprising a magnetic transducer and a gimbal type mount is attached to the distal end of the flexure, usually by spot welding. The other end of the head suspension has a nut plate welded thereto which includes a cylindrical boss that extends normal to the flat surface of the plate and is designed to mate with an opening disposed in the end section of the rigid element remote from the bearing opening. The head arm elements are aligned precisely and spot welded to maintain their alignment during the subsequent swaging operation.

The swaging operation involved a series of steps in which a cylindrical ball slightly larger than the opening in the boss is forced into the boss thereby forming the boss material to the area of rigid element surrounding the boss. Three separate operations are performed, each with a ball having a larger diameter. This swaging operation has become the most critical step in the manufacturing process as the size of the components has decreased and their fragility has increased.

The biasing force for the magnetic transducer is provided in the flexible element by bending the flexible element and subsequently returning the element to its original position while simultaneously stress relieving the bend area with a laser until the desired biasing force is obtained. The required biasing force is determined by the flying characteristics of the magnetic head relative to the magnetic disk surface.

Some of the above described problems were overcome by modifying the head arm to allow a plurality of head arms to be mechanically clamped on the pivot bearing assembly of the rotary actuator as described in the cross-referenced patent. In accordance with that modified arm design, a generally rectangular mounting plate of relatively rigid type material was provided with an opening for receiving the bearing. A relatively thinner metal member known as a flexure was provided with a gimbal type mounting for the magnetic transducer, and was spot welded to the end of the mounting plate remote from the bearing opening. The thin metal member provided a known bias to the head toward the disk surface during operation. The head arm therefore was made of two separate metal pieces, one of which produced the biasing effect to the transducer to maintain a uniform spacing from the disk surface. Two separate members were therefore required because the flexing characteristic of the member providing the biasing force to the head was substantially different from the flexing characteristic of the rigid member that provided the rigid support for the flexible member.

The method of assembling the head stack disclosed in the cross-referenced patent improved the head stack assembly process but the head arm assemblies per se still employed two separate members that were swaged together. A head arm assembly that avoids the use of two separate elements having different flex characteristics and which must be precisely attached to each other would result in a higher manufacturing yield and lower unit manufacturing costs and is therefore highly desirable.

A head stack assembly comprising a plurality of head arm assemblies, successive contiguous pairs of which can be selectively joined together in a fixed relationship, would also avoid many of the head stack problems of the prior art, in that the prior art swaging of the head arms to the pivot bearing could be eliminated and an individual head arm could be easily adjusted relative to adjacent head arms.

The present invention eliminates the need to use two separate members having different flexing characteristics, which are swaged together to form a head arm. The invention therefore avoids the steps of precisely clamping and then swaging these members together but still permits a head arm assembly to be created that may be readily assembled in a head stack assembly in accordance with the teachings disclosed in the cross-referenced patent or in accordance with an assembly process in which successive contiguous pairs of head arms may be selectively joined together.

SUMMARY OF THE INVENTION

An object of the present invention is to provide an improved head arm assembly for use with a rotary actuator of a magnetic head positioning system of a disk drive.

Another object of the invention is to provide a head arm assembly which comprises a single integral flexible element, one end of which is adapted to receive a gimbal type head mount and the other end being encased in a moldable material.

A further object of the invention is to provide an improved method of manufacturing a head arm assembly which does not require that two separate elements having different flex characteristics be joined together by a swaging operation.

A still further object of the present invention is to provide an improved head stack having a plurality of head arm assemblies wherein successive contiguous pairs may be selectively positioned and joined together.

In accordance with the present invention, a head arm assembly comprises a thin elongated flexible element which is provided at one end with an area adapted to receive a head gimbal assembly (HGA) and which has a known flex characteristic. The opposite end of the flexible element, which is adapted to be mounted on the pivot bearing of a rotary actuator during the head stack assembly process, is provided with an opening for the bearing. A portion of the element, including the bearing opening, is encased in a relatively rigid moldable material which functions to stiffen the flex characteristic of the encased section. The encased portion is designed to support the flexure section of the element that is not encased.

The uncased section of the element provides a biasing force which is determined in accordance with the flying characteristics of the magnetic transducer that is to be mounted on the arm element. The biasing force may be obtained in the uncased section in accordance with known prior art techniques, including bending the uncased section adjacent to the end of the added moldable material and relieving the stresses in the bend area by heating it with a laser until the required force to bias the magnetic head toward the disk surface is obtained.

The moldable material is preferably a plastic material that can be injected molded around the end portion of the thin elongated flexible element so that the dimensions of the opening, which is adapted to receive the bearing, may be readily controlled by the mold and the molding process. The molded section has a substantially rectangular cross-section in the area of the bearing opening, permitting successive pairs of contiguous head arm assemblies to be accurately aligned and selectively positioned relative to each other and selectively joined together either by clamping as in the cross-referenced patent, or by ultrasonic fusing of the plastic material on adjacent arms. Various alignment aids may be molded into the material encasing the flexible element. Separate inter-arm spacer rings, as suggested in the cross-referenced patent, could be omitted since the spacer ring function could be molded into the molded section material.

The above described arrangement provides a head arm assembly having a single element with two mutually exclusive flexing characteristics, which are independently selectable. This allows head arm assemblies to be designed and readily constructed for head positioning systems having substantially different requirements, such as arm length, head biasing forces and gimbal mount characteristics.

The nut plate employed in the prior art swaging process to attach the two elements of the head arm together was the main factor in preventing closer disk spacing. Since the one piece integral element construction eliminates the nut plate, closer arm spacing is possible thereby permitting closer disk spacing which eventually permits shorter disk stacks.

BRIEF DESCRIPTION OF THE DRAWING

The invention will be described in greater detail with reference to the drawings in which.

DESCRIPTION OF THE PREFERRED EMBODIMENT

Figure 1:
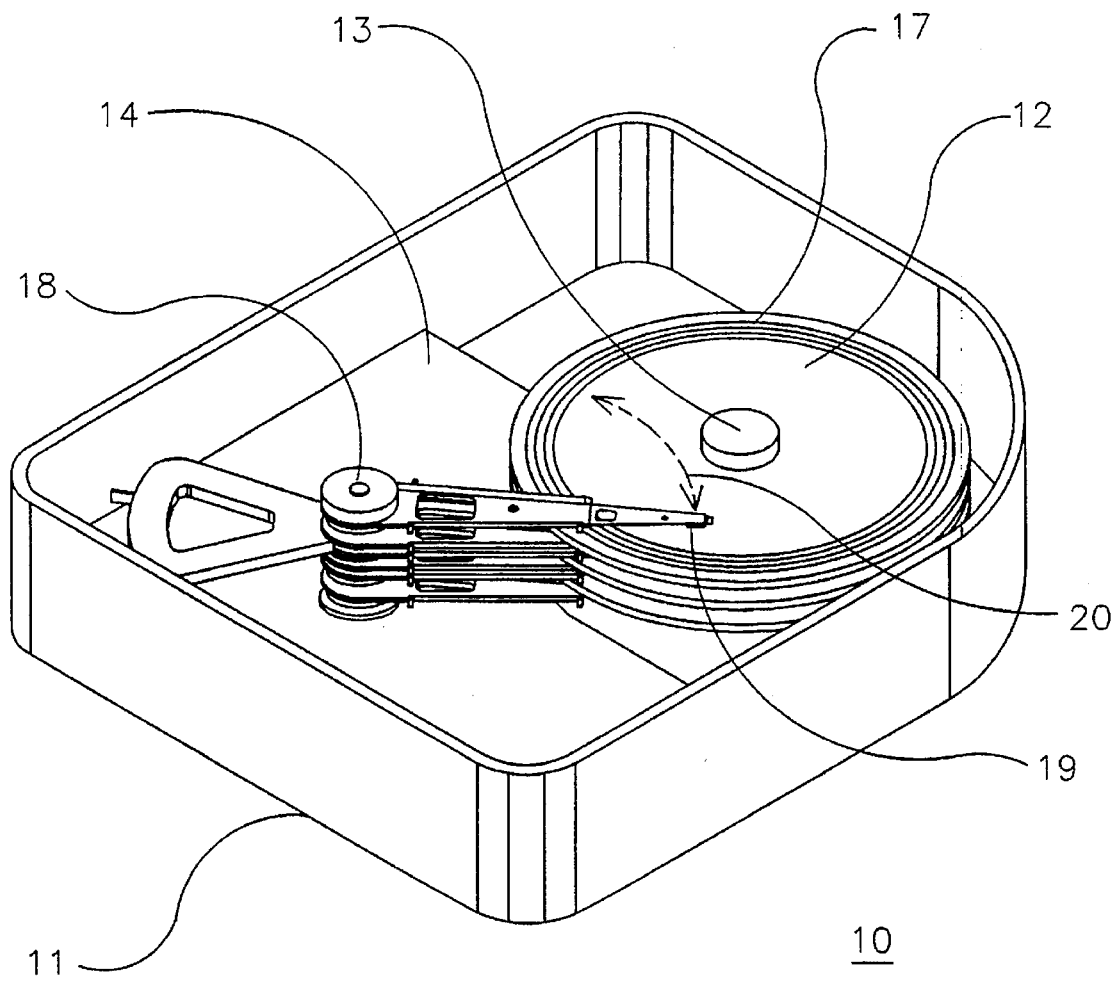
FIG. 1. is a schematic plan view of a disk drive showing the physical relationship of the magnetic disks, the rotary actuator and the head arm assembly.

FIG. 1 is a schematic plan view of a disk drive 10 which includes a baseplate 11 on which is mounted a plurality of magnetic disks 12 that rotate about an axis 13 that is normal to the surface 14 of the baseplate 11. The disks 12 are normally rotated at a constant speed during the transfer of data to and from the disks by means of a motor(not shown) that may be positioned under the baseplate 11. Each disk has a relatively large number of closely spaced concentric recording tracks 17. The drive 10 includes a rotary type actuator 18 for positioning magnetic heads 19 relative to imaginary cylinders of recording tracks defined by tracks 17 on each of the recording surfaces of disks 12. The magnetic heads 19 are moved in an arc 20 across the surface of disk 12 during track accessing.

Figure 2:
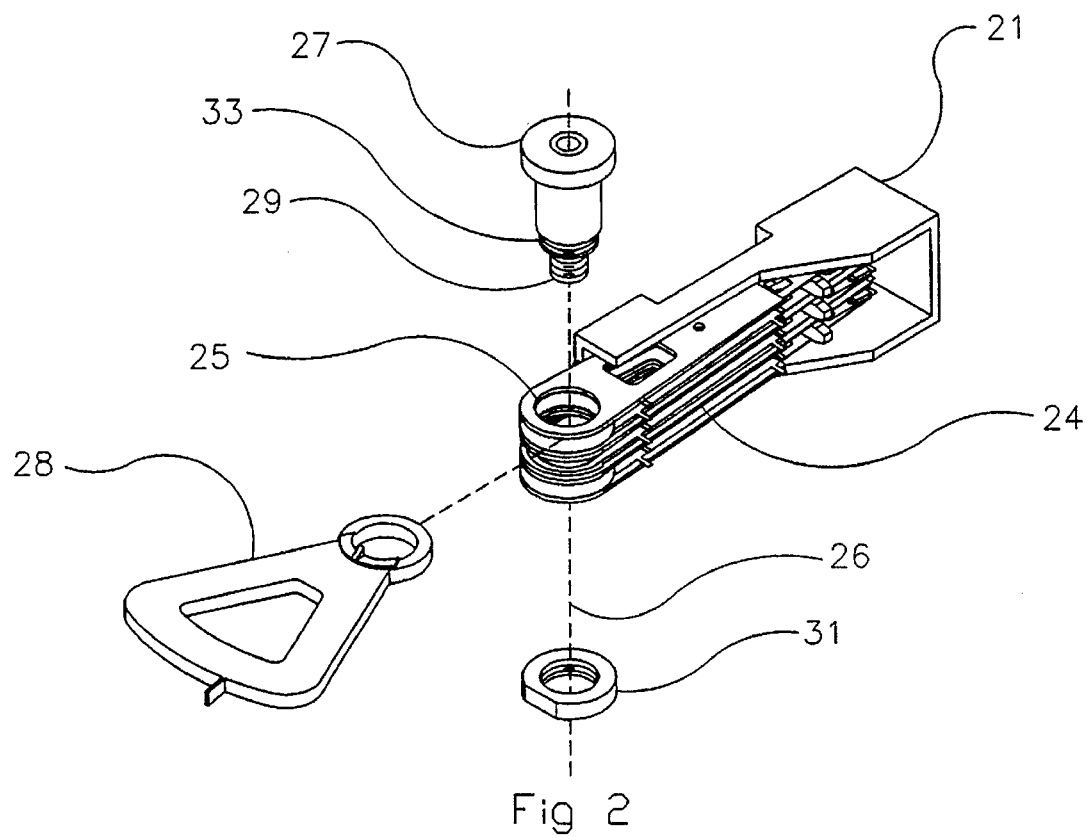
FIG. 2 is a perspective view of the headstack assembly during the assembly process.

FIG. 2 illustrates a plurality of head arm assemblies during the head stack assembly process. FIG. 2. corresponds generally to FIG. 2 of the cross-referenced U.S. Pat. No. 5,410,794. As shown in FIG. 2, a component caddy 21 is employed to position the head arm assemblies 24 with their respective pivot bearing receiving openings 25 aligned on a common axis 26. The pivot bearing 27 is inserted through the aligned openings 25, and the arm assemblies 24, including the flat coil armature 28, are clamped together. The end 29 of the spindle 27 may be provided with threads for mounting the spindle 27 to the baseplate 11. The spindle 27 also has a threaded portion 33 for engaging a nut 31 to clamp the head arm assemblies together. Further details of the overall assembly process and the caddy construction may be found in the cross-referenced patent.

Figure 3:
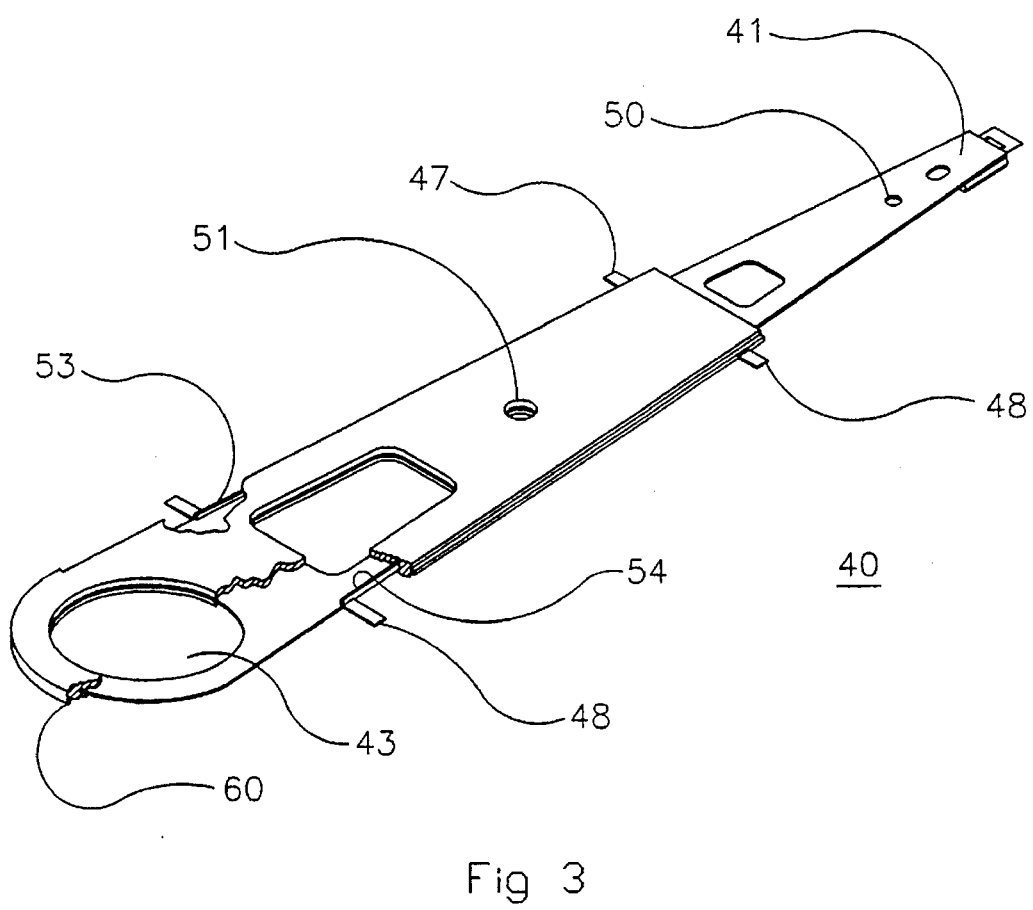
FIG. 3 is a perspective view, partly broken away, of one of the head arm assemblies shown in FIG. 2, illustrating the improved construction.

As shown in FIG. 3 the head arm assembly 24 of the present invention comprises a relatively thin sheet metal element 40 having a generally elongated rectangular shape. Element 40 is provided at one end 41 with an area adapted to receive a head gimbal assembly (HGA) (not shown) which comprises a gimbal type mount on which a magnetic transducer may be mounted.

At the opposite end of element 40, an opening 43 is provided into which a pivot bearing of a rotary actuator 18, similar to that shown in FIG. 1, may be inserted. The element 40 may be formed by etching a number of elements from a large sheet metal piece. The flex characteristics of the sheet metal member 40 are selected to conform generally to the flying characteristics of the magnetic head.

The element 40 includes a pair of tabs 47,48 which may be used to clamp the electrical leads connected to the magnetic transducer. Openings 50 and 51 are provided to assist in aligning the various head arm assemblies relative to each other prior to securing them on the bearing assembly 27.

The element 40 is provided with a pair of stiffening ribs 53, 54 obtained by bending opposite edges perpendicular to the flat surface of element 40. The end of element 40 which is to be attached to the pivot bearing is encased in moldable material 60. The function of the material 60 is to modify the flex characteristics of element 40. The moldable material is selected in connection with the stiffening ribs, so that the unencased section of element 40 is rigidily supported relative to the surface of the disk. This permits the magnetic head to be biased with the desired force when the assembly is mounted on the disk file.

An injection type molded plastic material, having a relatively low compressibility, is employed in the preferred embodiment. As shown, the molded portion of the arm assembly has a substantially rectangular cross-section and extends over more than half of of the length of the element 40. The flat surfaces forming the rectangular cross-section of the molded material permits spacer rings to be inserted between adjacent arms to control the inter-arm spacing as discussed in the cross-referenced U.S. Pat. No. 5,410,794. If desired, the function of the separate spacer rings may be made an integral part of the molded portion by either embedding the metal spacers in the molded material or forming the mold to allow the plastic material to act as the spacer. The assembly with a molded portion lends itself to easy alignment of the elements of the head arm assembly.

A modification to the head stacking arrangement shown in FIG. 3 involves eliminating the clamping arrangement of the head arm suggested in the cross-referenced patent and instead ultrasonic bonding the head arms together. In this modification, the bearing receiving openings of the individual head arm assemblies cooperate to form a cylindrical cavity into which the pivot bearing is press fit. Suitable openings in the molded material are also provided at various locations to permit successive pairs of contiguous head arms to be utrasonically bonded together. This permits each arm to be accurately positioned relative to its neighbor prior to bonding. An alternate arrangement for holding the head arm stack together would involve the provision of aligned rivet pin receiving openings in the molded material of the head arm to permit riveting the head arms together to form the head stack.

Figure 4:
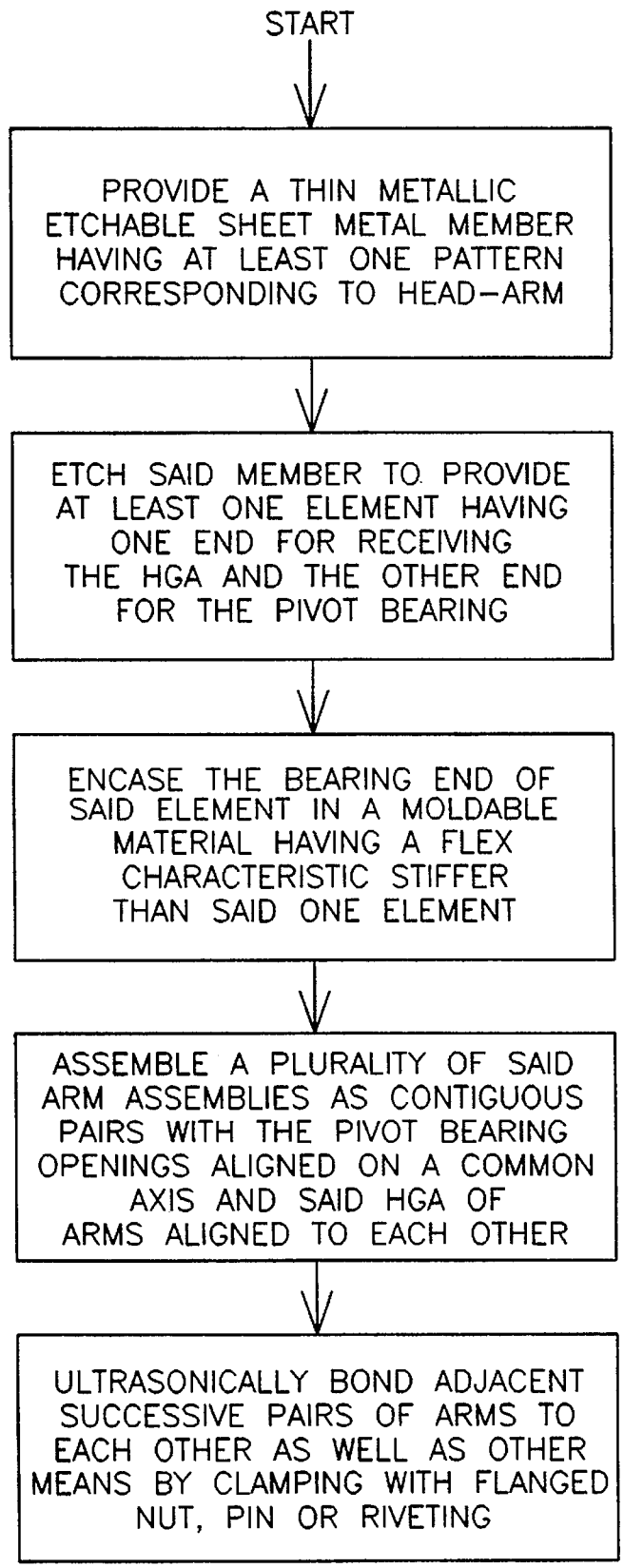
FIG. 4 is a flow chart illustrating the basic steps involved in the method of manufacture.

FIG. 4 is a flow chart which illustrates the basic steps of the method. The flow chart is self-explanatory when read in connection with the above detailed description of the head arm assembly.

Various modifications may be made to the preferred embodiment without departing from the teachings of the present invention or the scope of the appended claims. For example, the molded portion of the assembly 24 does not have to be formed by injection molding. The equivalent stiffening function may be obtained by providing a pair of separately molded parts that can encase the end section of the element 40 by snapping the molded parts together, which also provides alignment of the head arms. Also each part can engage a mating area on the flexible element 40. Similarly, the two parts may be cemented together by a suitable cement, rather than being just snapped together. It should be noted that the element 40 and the molded arm, made of plastic, may be configured with different profiles for stiffness, resonance, weight and overall dynamics.

What is claimed is:

1. A head arm assembly for use with a rotary actuator positioning system of a disk file comprising:

an integral elongated flexible head arm element made of a relatively thin sheet of metal;

a head gimbal assembly disposed at one end of said element;

said element comprising a material having a first flex characteristic predetermined in accordance with selected specifications of said head gimbal assembly; and an opening in said element for accommodating insertion of a pivot bearing at an end of said element opposite to said one end wherein said pivot bearing supports said element for rotation;

a molded material encasing a section including said opening for the pivot bearing opposite to said one end and spaced from said head gimbal assembly, said molded encased section having a different flex characteristic than said first flex characteristic.

2. An assembly as in claim 1 in which said first flex characteristic corresponds to the force to bias said head gimbal assembly towards a magnetic disk of said disk file.

3. An assembly as in claim 2 in which said first flex characteristic is relatively more flexible than said different flex characteristic of said molded section.

4. The combination set forth in claim 1 in which the sides of said element that are encased in said material are bent normal to the flat surface of said element.

5. A head stack assembly for use with a magnetic head positioning system of a disk file data storage device comprising:

a plurality of head arm assemblies, each head arm assembly comprising an elongated relatively thin element having one end adapted to receive a head gimbal assembly, said thin element comprising a material having a first flex characteristic selected in accordance with the force desired to bias the head of said head gimbal assembly relative to a magnetic disk of said disk file device, the end of said element opposite to said one end having an opening which permits the insertion of a pivot bearing and a molded material having a generally rectangular cross-section encasing a section of said opposite end, said material having a relatively stiffer flex characteristic than said first flex characteristic, said plurality of head arm assemblies being disposed in registry with the center of their respective pivot bearing openings aligned on a common axis and bonded or attached together to provide said head stack assembly, which is then rotatable about said common axis.

6. A method for manufacturing a head arm assembly for use with a magnetic head positioning system of a disk file data storage device comprising the steps of:

providing a relatively thin sheet petal member comprising a material having a first flex characteristic predetermined in accordance with selected specifications of said head arm assembly;

forming at least one integral elongated substantially rectangular element from said thin sheet member to provide one end for receiving a head gimbal assembly;

providing an opening in an opposite end of said element for receiving a pivot bearing wherein said pivot bearing supports said element for rotation; and encasing a section of the end opposite to said one end with a moldable material having a relatively stiffer flex characteristic than said first flex characteristic.

7. The method set forth in claim 6 in which said step of encasing includes the further step of providing a plurality of openings in said moldable material to permit bonding or attaching a plurality of said head arm assemblies together to form a headstack assembly.

8. The method set forth in claim 6 in which said step of forming includes the step of simultaneously etching a plurality of said elements, each of which is provided with a plurality of arm alignment openings and said pivot bearing receiving opening, said openings being disposed in an identical spatial relationship in each of said elements.

9. The method set forth in claim 8 in which said step of etching includes the steps of etching an opening in said opposite end and inserting a pivot bearing in said opening during a subsequent headstack assembly operation, and etching at least one additional opening in said element to assist in aligning said head arm assembly relative to other head arm assemblies during said subsequent headstack assembly operation.

10. The method set forth in claim 9 in which said step of encasing includes the steps of providing an injecting molding apparatus having a mold;

positioning said opposite end in said mold; and injecting said moldable material into said mold to encase said opposite end.

* * * * *